(No Model.)
C. BRICK.
POTATO DIGGER.
No. 407,465. Patented July 23, 1889.
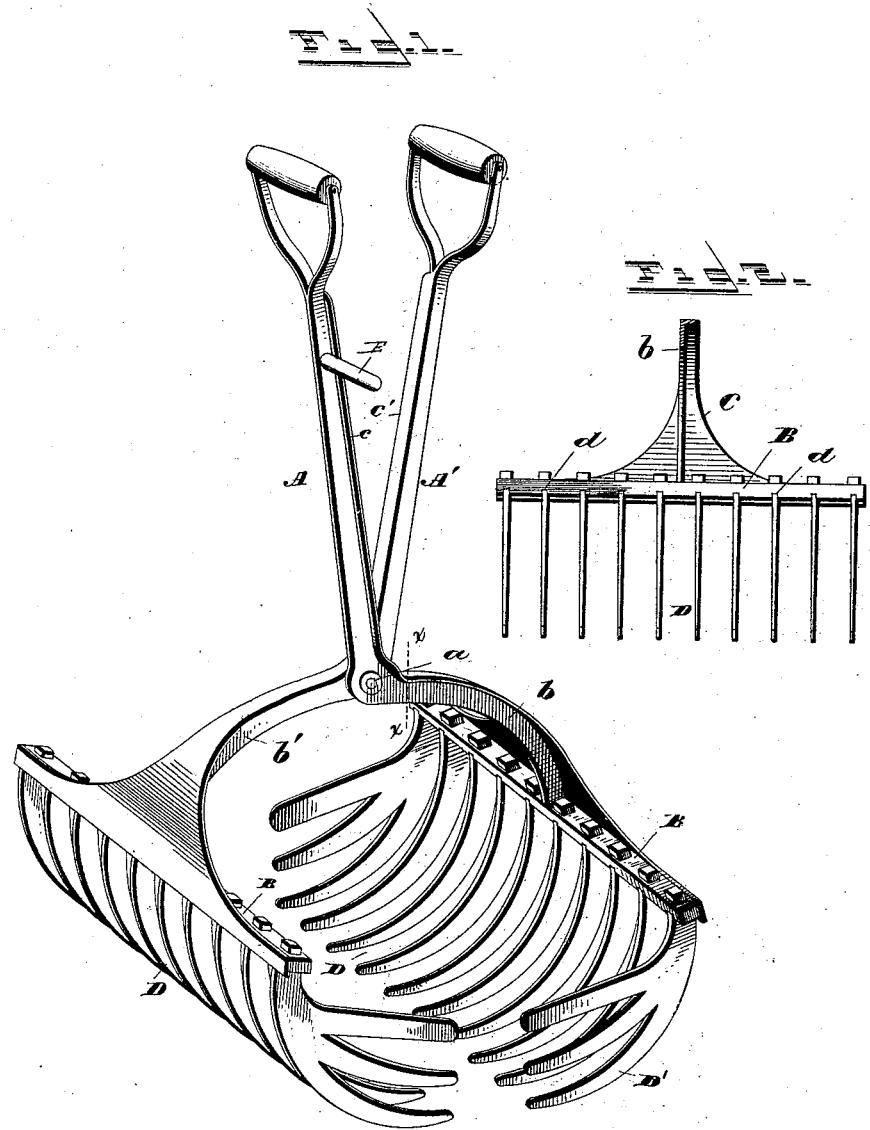
Charles Brick.
Inventor
Witnesses
By his Attorney

UNITED STATES PATENT OFFICE.

CHARLES BRICK, OF SOUTH BEND, INDIANA.

POTATO-DIGGER.

SPECIFICATION forming part of Letters Patent No. 407,465, dated July 23, 1889.

Application filed March 11, 1889. Serial No. 302,789. (No model.)

*To all whom it may concern:*

Be it known that I, CHARLES BRICK, a citizen of the United States of America, residing at South Bend, in the county of St. Joseph and State of Indiana, have invented certain new and useful Improvements in Potato-Diggers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in potato-diggers, the object being to provide a hand implement provided with teeth which when the handles are separated can be forced into the ground and closed to form a basket, and when drawn out of the ground will remove the potatoes or other roots therefrom; and my invention consists in the special construction and combination of the parts, as will be hereinafter fully set forth, and specifically pointed out in the claims.

In the accompanying drawings, Figure 1 is a perspective view of a potato-digger constructed in accordance with my invention. Fig. 2 is a sectional view taken through the line $x\ x$ of Fig. 1.

In the accompanying drawings, A and A' refer to the handle-bars, which are pivoted to each other at $a$, from which point they are curved outwardly and connected to the cross-bars B B. The handle-bars A A are bifurcated at their upper ends to form shovel-handles, and upon one of the bars beneath the handle thereof is attached a supplemental handle E, as shown, to enable the operator to obtain a grip at a lower point on the handles for lifting the device from the ground. The handle-bars are preferably composed of flat bars of metal re-enforced and stiffened by means of plates $c$ and $c'$, which are either formed integral therewith or suitably attached thereto. These re-enforcing strips are attached to the adjacent edges of the handle-bars and are continued downward over the curved portions $b\ b'$, the ends thereof being extended laterally to re-enforce the cross-bars B B. These plates or re-enforcing strips give great rigidity to the handle-bars and re-enforce them against lateral strain. They also serve to more securely connect the cross-bars B B to the handles and form a screen or continuation of the basket above the bars B B. The under sides of the bars B B are provided with a series of recesses or notches $d\ d$, which are intersected by the perforations through which the bolts formed on the upper ends of the curved teeth pass. To the bars B are attached a series of curved teeth D by means of the bolts formed thereon engaging with nuts, which teeth come nearly to a point and slightly taper, while their upper ends lie within the notches $d$ and are of the same width as the width of the bars B, so that the rear edges thereof will abut against the re-enforcing strips which overlap the outer edges of said bars. The end teeth D' are provided above the lower tooth or tine with two inwardly-projecting teeth located above the same and formed integral therewith, which supplemental teeth serve to close the ends and form a basket.

My invention in use is operated as follows: The jaws are first separated by parting the handles and the teeth forced into the ground by either pressing upon the handles, or by simply parting the handles, then placing teeth to ground, and the teeth are forced into ground by drawing handles together, or by the operator placing one foot and his weight directly above the pivot-pin, as the handles when separated form a flat space above said pivot. After the teeth have been forced into the ground for a sufficient depth the handles are drawn together, which closes the sections to form a basket. Now, by drawing the implement out of the ground the potatoes will be brought therewith, and by shaking or rocking the device the earth can be sifted from the roots, after which they can be deposited in a basket or other receptacle.

The device hereinbefore described can be easily operated without the exertion of much manual power, and as the edges of the teeth are rounded they will not cut the potatoes.

The depth to which it is desired the teeth should enter the ground can be regulated by spreading the handles.

Having thus described my invention, what I claim as new, and desire to secure by Letters Patent, is—

1. The combination, in a potato-digger, of the pivoted handle-bars A and A', provided at their lower ends with cross-bars B, to which tines or teeth are attached, and re-enforcing strips c and c', secured to said handle-bars, the lower portion of said re-enforcing strips having diverging ends which overlap the outer edges of the cross-bars B, substantially as shown, and for the purpose set forth.

2. The combination, in a potato-digger, of the handles A and A', pivoted to each other and provided at their upper ends with spade-handle grips, one of said handles being provided below its grip with a laterally-extending handle, whereby the upper ends of the handles can be held together by one hand while they are being drawn upwardly by the other hand, substantially as shown, and for the purpose set forth.

3. The combination, in a potato-digger, of the handle-bars A and A', pivoted to each other and provided with downwardly-curved portions b b, a flat portion being provided above the pivot when the handle-bars are separated, re-enforcing strips or plates c and c', secured at right angles with the handle-bars, cross-bars B, attached to the lower end of the handle-bars and to the re-enforcing plates, curved teeth D, and end tines carrying two or more teeth, the parts being organized substantially as shown, and for the purpose set forth.

In testimony whereof I affix my signature in presence of two witnesses.

CHARLES BRICK.

Witnesses:
ABRAHAM L. BRICK,
HENRY WAGEMAN.